United States Patent Office 3,431,633
Patented Mar. 11, 1969

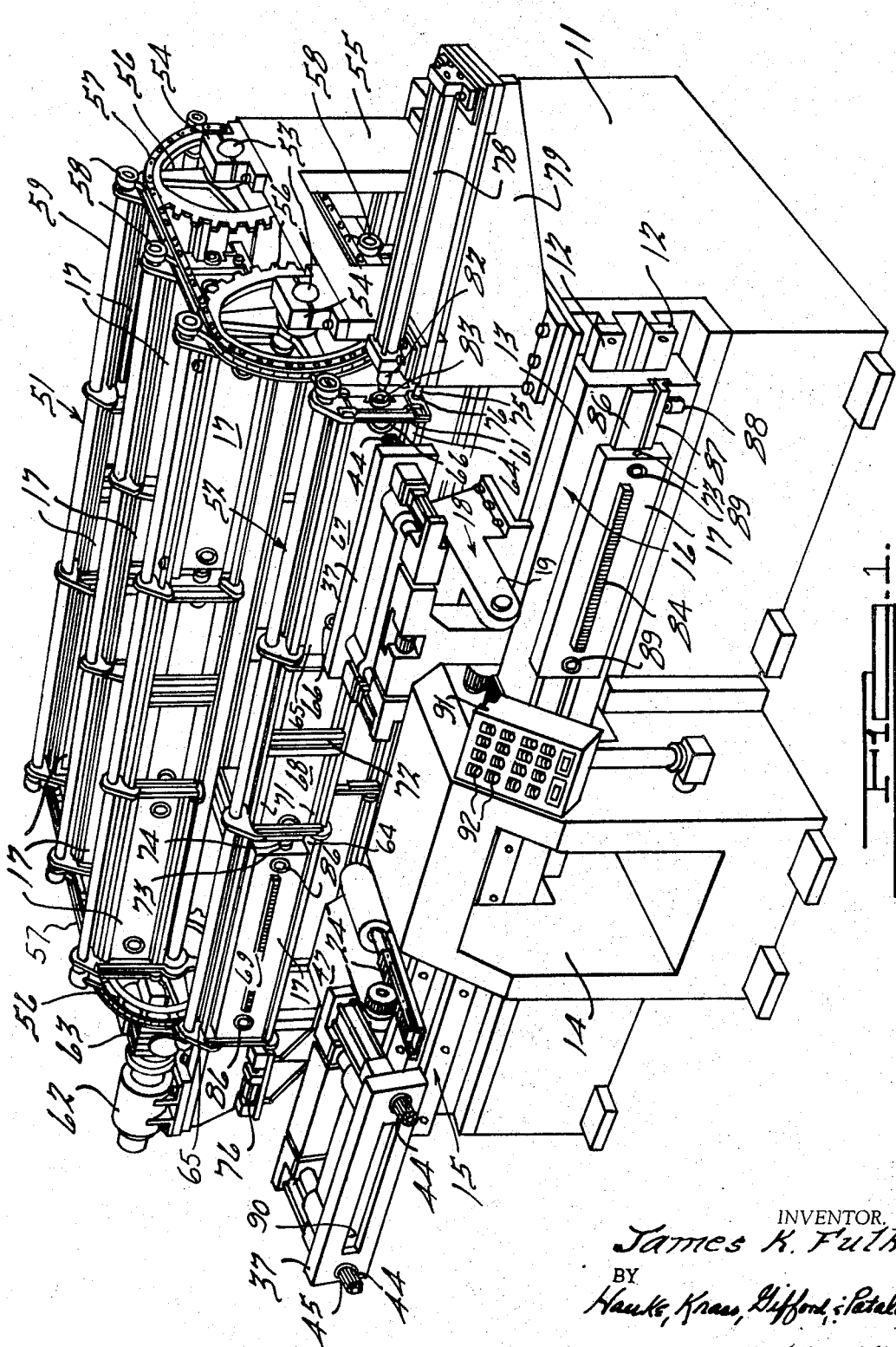

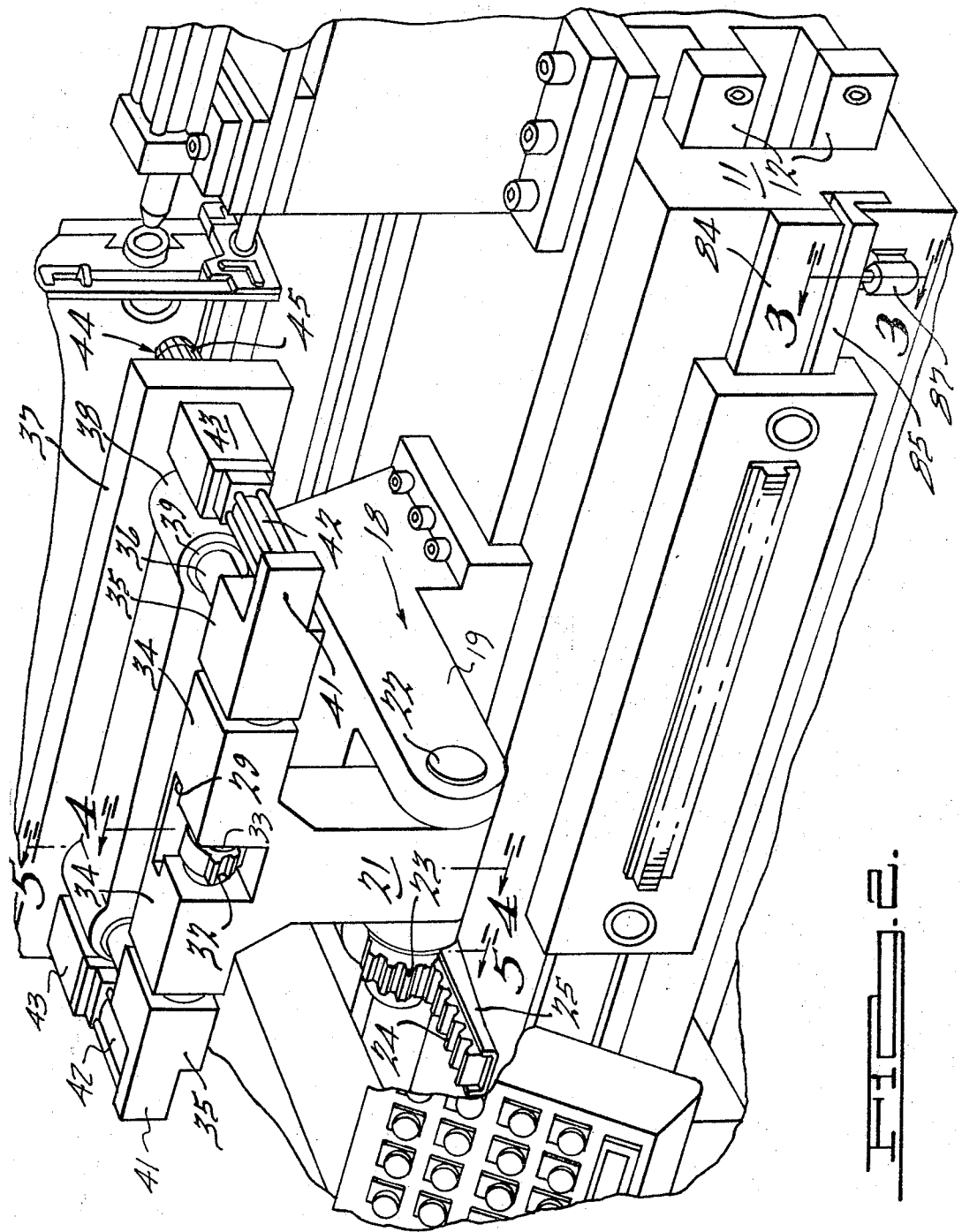

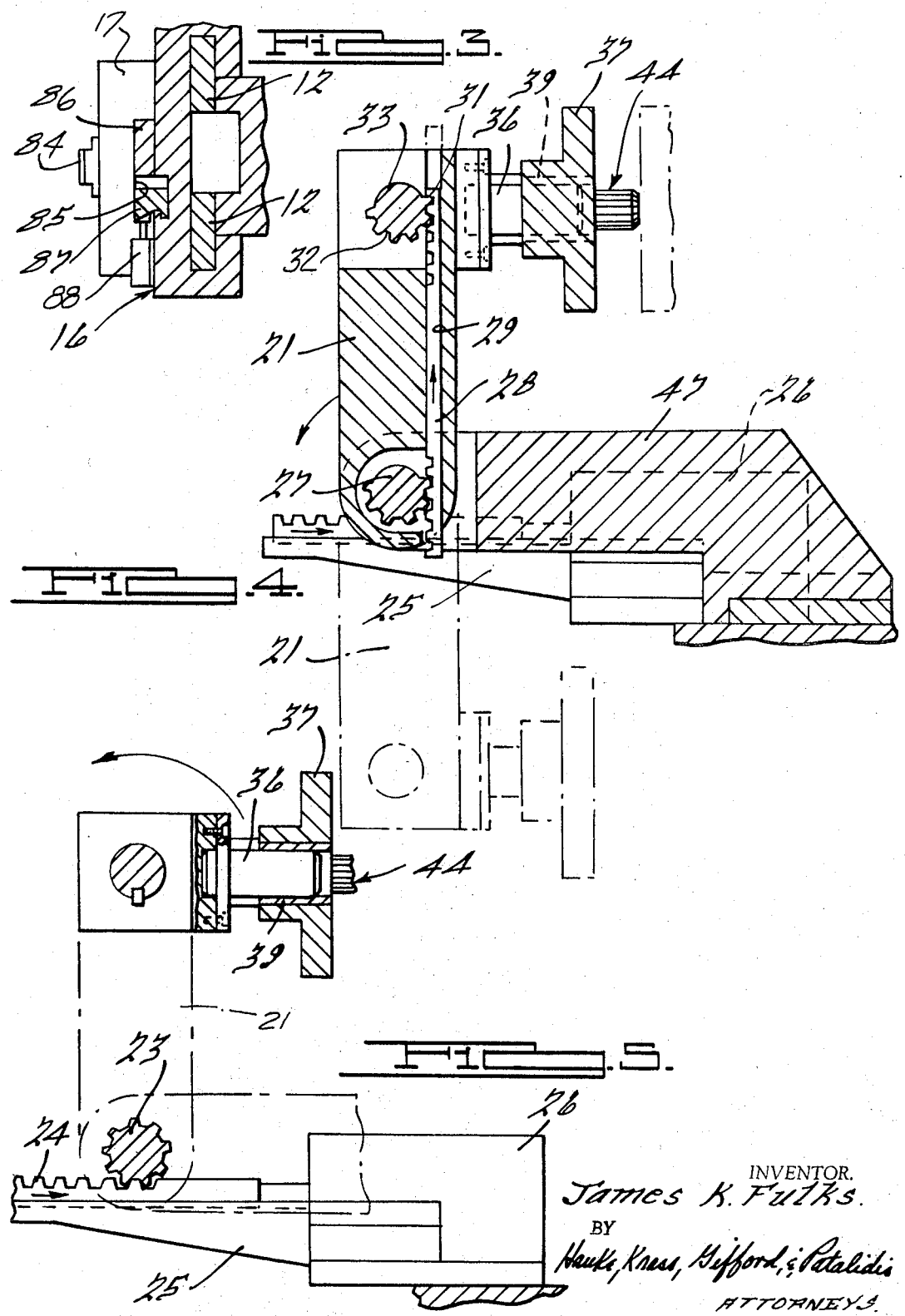

3,431,633
BROACHING APPARATUS HAVING AUTOMATIC TOOL-CHANGING MEANS
James K. Fulks, Detroit, Mich., assignor to Colonial Broach & Machine Company, Warren, Mich., a corporation of Delaware
Filed Dec. 5, 1966, Ser. No. 599,113
U.S. Cl. 29—568                     5 Claims
Int. Cl. B23d 37/00

ABSTRACT OF THE DISCLOSURE

A method and an apparatus for performing a broaching operation on a workpiece by serially applying broach sections to the workpiece. The broach sections successively are removed from a storage area, clamped to a support which is advanced past the workpiece to effectuate a partial broaching operation and returned to the storage area.

Background of the invention

This invention consequently relates to transfer devices for broach sections and to a method of progressive broaching by applying the sections serially to a workpiece.

The use of transfer devices for removing a tool from a storage area, disposing the tool in a working position, performing a machining operation on a workpiece, returning the tool to the storage area and repeating the sequence with another tool for performing a subsequent machining operation on the workpiece, have been known for some time already in the art of machining effected by means of milling machines, lathes and the like. However, in the art of broaching it has been heretofore the practice to employ a single support having a broach thereon for movement past a workpiece.

Summary of the invention

The present invention pertains to a broaching machine having a storage area for a plurality of broach sections employed in combination with transfer means which applies each broach section to a support adapted to advance the section past a workpiece, and which removes each broach section from the support and returns it to the storage area. In this manner, a broaching operation is performed on a workpiece by a plurality of broach sections which are programmed so as to be applied serially to the workpiece or which may be arranged to skip or add sections when performing the broaching operation. Any type of broaching machine may be employed since the novelty of the invention resides in the use of broach sections in regular or selective order to perform a broaching operation on the face of a workpiece. There is provided a storage area for the plurality of broach sections located in a selected position relative to each other and employed in combination with a device for transferring a section from the storage area to the support which advances each section across the face of the workpiece, and a device for the removal of each broach section and its returns to its proper position relative to the other broach sections in the storage area. Through the application of the plurality of broach sections to the face of the workpiece, the broaching operation is completed to desired depth with or without a facing operation on the adjacent outer surface. The movement of the sections may occur at different speeds, the roughing operation may occur at a reduced speed relative to that of the finishing operation. The individual broach sections may be made of different materials to withstand the different operations under varying strain conditions and at different speeds. As a result, a complete broaching operation may be performed by a machine occupying a substantially reduced floor space as compared to conventional broaching machines, with a proportional reduction in cost, with practically no increase in the time required for a complete broaching operation since the return stroke of the broach carrier may occur at high speeds relative to the speed of the working stroke thereof.

Accordingly, the main objects of the invention are: to perform a broaching operation on an area of a workpiece by a plurality of broach sections which are applied thereto serially; to provide an area for the storage of broach sections in predetermined relationship to each other; to provide means for extracting the broach sections from the storage area and for applying them to a support which advances each section across the face of a workpiece after which it is returned to its appropriate position in the storage area; to provide a broaching device which has means for advancing a broach section across a workpiece combined with a storage area containing a plurality of broach sections to which each broach section is returned after each consecutive partial broaching operation; to increase the depth of the broached area each time a broaching section is passed thereover; and in general, to provide a transfer mechanism for broach sections of the character indicated which is simple in construction, positive in operation and economical of manufacture.

Other objects and features of novelty of the invention will be specifically pointed out or will become apparent when referring, for a better understanding of the invention, to the following description of an example of practical embodiment thereof when considered in conjunction with the accompanying drawings, wherein:

Brief description of the drawings

FIGURE 1 is a perspective view of an example of a broaching machine having a plurality of broach sections in a storage device embodying features of the present invention;

FIGURE 2 is an enlarged, broken view of the front righthand corner of the machine illustrated in FIGURE 1;

FIGURE 3 is an enlarged, broken sectional view of the structure illustrated in FIGURE 2, taken on the line 3—3 thereof;

FIGURE 4 is an enlarged, broken sectional view of the structure illustrated in FIGURE 2, taken on the line 4—4 thereof, and FIGURE 5 is an enlarged, broken sectional view of the structure illustrated in FIGURE 2, taken on the line 5—5 thereof.

Description of the preferred embodiment

While any type of broaching machine may be used on which a transfer mechanism is employed, the described machine is shown by way of example rather than by limitation.

The illustrate machine has a base 11 with opositely facing guide bars 12 on the front which receive and guide a broach carrier support 13. Suitable drive means are provided for the broach carrier support such as a rack and pinion, a ram, and the like which have been employed heretofore for operating broaches in reciprocation. A work station 14 is disposed centrally of the guide bars 12 to provide a loading area 15 from which a broach carrier is moved to a removal area 16 on the opposite side of the work station 14.

By reference to the drawings, it will be noted that a broach carrier 17 is mounted on the carrier support 13 and has been moved from the loading station 15 past the work to broach an area thereof and to the removal area 16 where it will be removed. A broach carrier removal device 18 is supported on the top front edge of the bed 11 and has a frontwardly projecting bifurcated end 19 in which an arm 21 supported on a shaft 22 which is fixed thereto. As best seen in FIGURE 5, the shaft carries a gear 23 having teeth in engagement with the teeth of a rack 24 which is reciprocated in a channel support 25 when moved forwardly and rearwardly by a shaft connected to a piston (not shown) within a cylinder 26. Such a device is illustrated as an example and not as a limiting structure.

As illustrated in FIGURES 4 and 5, the arm 21 is rotatable from a vertical position above the unit gear 23 through 180° to a downward position below the gear 23. A gear 27, illustrated in FIGURE 4, also fixed to the shaft 22, has teeth in engagement with the teeth of a second rack 28 which moves in a slot 29 in the arm 21 having teeth on the upper end 31 which mesh with teeth on a gear 32 on a shaft 33 journaled transversely in bosses 34 at the ends of the arm 21. The shaft 33 is capable of rotation 180° from a right-hand position relative to the arm 21 when the arm is above the shaft 22 and to the same right-hand position when the arm 21 is moved to a position below the shaft 22. As best seen in FIGURE 2, the portions of the shaft 33 outwardly of the bosses 34 have blocks 35 fixed thereto for movement therewith. Stub shafts 36 extend from the blocks to slidably support a bolster 37 on hubs 38 carrying sleeve bearings 39. The blocks 35 have extensions 41 which support cylinders 42 each having a piston rod which is reciprocable within the cylinder to move each block 43 and the bolster 37 secured thereto toward and away from the blocks 35. Expansible cylindrical holding elements 44 are supported on the centerline of the bolster near the ends thereof, having a central piston for expanding the individual members 45 of the holding element 44.

A broach carrier loading device 47 on the opposite side of the work station 14 is the same as the broach carrier removal device 18 except for being symmetrically disposed. In other words, both of the devices have their respective racks 24 located adjacent to the work station 14.

As seen in FIGURE 1, a movable storage device 51 has a plurality of racks 52 for supporting a plurality of broach carriers, herein illustrated as three in each rack. The storage device 51 may be of an appropriate length so as to carry any appropriate number of racks 52, each one of which may store a broach carrier 17. The storage device 51 is carried by a pair of shafts 53 mounted in bearings in blocks 54 at each end of the shafts, the blocks being secured on uprights 55 mounted at each end of the base 11. Adjacent to each block each shaft 53 carries a sprocket wheel 56 with a chain 57 being supported by a pair of sprocket wheels at each end of the shafts. The chains carry bearing blocks 58 which in turn support shafts 59 for rotational movement between the chains 57. Each of the shafts 59 has a frame 61 secured thereto for free swinging movement with the shaft as the chains are advanced to bring a frame 61 to the stations 15 and 16. A motor 62 drives through a speed reducing mechanism 63 one of the shafts 53 and the sprocket wheel 56 thereon.

Each frame 61 has a bottom platform 64 on which a broach carrier 17 rests and a rear wall 65 against which the broach carrier abuts. A pair of apertures 66 through the wall 65 are aligned with the pair of holding elements 44. Such walls and apertures are provided in each of the frame sections 67, 68 and 69 in each of the frames 61 for supporting three broach carriers 17 in aligned end to end relation to each other. The central section 68 has top and bottom walls 71 braced at the center by an element 72 to add strength to the frames and to enclose and guide the central broach carrier in each of the frames 61. A further guide is provided by a boss 73 on the right-hand end of the broach carrier 17 and a boss 74 on the left-hand end thereof, which engage each other when the broach carriers are moved to the left within the frame 61. When a frame 61 is located adjacent to the bolster 37, it is locked in position by a piston rod 75 carried by a ram 76 at each end of the frame which extend in end apertures 77 and lock the frame in firm fixed position. When a broach carrier 17 is delivered into the section 67 of the frame 61 and a broach carrier has been removed from the section 69 thereof, the broach carriers in the sections 67 and 68 are shifted to the left. A ram 78 is carried on a support 79 at the right-hand end of the machine, as illustrated in FIGURE 1. The ram carries a piston rod 82 which passes through an aperture 83 in the end wall of the frame 61 for engaging the boss 73 of the broach carrier 17 and advancing it into the section 68. This moves the broach carrier from the section 68 to the left into the section 69. This leaves the right-hand section 67 empty of a broach carrier and free to receive the next broach carrier after it has been advanced by the support 13 across the face of the workpiece.

It will be noted from the position of the various parts of the machine as shown in FIGURE 1, that a partial broaching operation has been performed by a broach section 84 secured to the broach carrier 17 at the right-hand end of the support 13. As shown in FIGURES 1 and 3, the inner face of the broach carrier 17 has a recess 85 adapted to receive a supporting element 86 and an associated locking dovetail member 87, which is moved away from the supporting element 86, after the carrier 17 has been placed thereover at the loading station 15, by ram 88 operated to pull the dovetail member 87 downwardly. After finishing the broaching operation the removal device 18 at station 16 is actuated to move the bolster from a position adjacent to the section 67 of the frame 61 to a position adjacent to the broach carrier 17, as illustrated in dot-dash lines at FIGURE 4. Thereupon the bolster 37 is advanced to engage the outer face of the broach carrier 17 while inserting the holding elements 44 through apertures 89 in the broach carrier 17 which are aligned with the holding elements. Apertures, not shown, are provided in the supporting element 86 for receiving the projecting ends of the holding elements 44, and an elongated cut-out portion, not shown, is disposed on the face of the bolster to provide clearance for the broach section 84. The movement of the bolster 37 is produced by the operation of the cylinders 42 which advance the blocks 43 an dthe bolster 37. Thereafter the piston in the expanding element 44 moves the members 45 outwardly into firm fixed engagement with the walls of the apertures 89. Thereupon rams 88 move the dovetail member 87 toward the supporting element 86 to release the carrier 17 which is moved outwardly away from the support 13 by the retraction of the bolster 37. Thereupon the reverse rotation of the arm 21 and bolster 37 returns the bolster to the position illustrated in FIGURE 1. Thereupon the bolster is advanced to move the broach carrier 17 into the frame 61 against the face of the wall 65 of the section 67 with the holding elements 44 extending through the apertures 66. Thereupon, the elements 45 of the holding elements 44 are collapsed and the bolsted 37 and the holding elements 44 are moved away from the broach carrier 17 to the position illustrated in the figure.

Meanwhile, the broach carrier 17 in the section 69 of the frame 61 has been engaged by the bolster 37 of the loading device 47, the face of which has a recess 90 for receiving the broach section 84 when the face of the bolster engages the face of the broach carrier 17. The holding elements 44 pass through the apertures 89 of the broach carrier 17 and the members 45 thereof are expanded to firmly engage the aperture walls. Thereafter the bolster 37 along with the broach carrier 17, is moved backwardly out of the section storage 69 to be clear thereof. Meanwhile, the carrier support 13 has returned to the left-hand end of the machine to the station 15 where it is accurately located in position to receive the broach section 17 from the storage section 69. The broach section 17 is applied to the support 13 by moving the bolster 37 forwardly in the manner pointed out hereinabove. The rams 88 draw the dovetail member 87 downwardly to securely lock the carrier 17 on the support 13. Thereupon, the elements 45 of the holding elements 44 are retracted and the bolster 37 is then moved away from the carrier 17 on the stub shafts 36 in the manner as pointed out hereinabove. The arm 21 on the loading device 47 is swung backwardly in readiness for removing a broach carrier from the station 69 in the next adjacent frame 61 when advanced to the stations 15 and 16.

A pedestal 91 has a plurality of switch buttons 92 by which the machine is operated manually, automatically or through a programming arrangement for applying the broach sections 84 as they are oriented within the frame 61 or by selecting any of the broach carrier 17 carrying certain related broaches so that broaches located in any position within the storage device 51 may be moved to the section 69 and applied to the support 13. It is to be understood that the storage device may be made substantially larger by employing longer chains and increasing the distance between the bearing blocks 54 and lengthening the shafts 59 so that more sections 67, 68 and 69 may be provided thereon.

From the preceding description one can readily understand that many types of storage areas may be used for retaining the broach sections in predetermined relation to each other, that many types of devices may be employed to apply a particular broach section from the storage area to the carrier and for removing the broach section and returning the section to its place in the storage area after it has been moved past the workpiece, and for supporting and driving the carrier at the same or different speeds past the workpiece.

I claim:
1. A broaching apparatus comprising storage racks, a plurality of broach carriers, a broaching tool secured to each broach carrier, said storage racks including means for storing said broach carriers, said broach carriers being disposed in a predetermined relationship to each other, a carrier support having means for releasably securing at least one broach carrier thereon, means for reciprocating said carrier support, a station for supporting a workpiece, said station being adjacent to and intermediate the path of movement of said carrier support, means for automatically transferring a broach carrier from said storage racks to the support carrier at one side of the workpiece supporting station, and means for automatically removing the broach carrier from the carrier support at the other side of the workpiece supporting station after said broach carrier has been advanced past said workpiece supporting station.

2. In a broaching apparatus as recited in claim 1, wherein said removing means returns said broach carrier to a predetermined position in the storage area.

3. In a broaching apparatus as recited in claim 1, wherein means are provided for moving another broach carrier to a position at said one side of the work station where it is received by the carrier support upon the return of said carrier support to said one side.

4. In a broaching apparatus as recited in claim 1, wherein the broach carrier returned to the storage area is advanced to said one side of the work supporting station in a predetermined sequence with other broach carriers.

5. In a broaching apparatus as recited in claim 1, wherein said transferring means removes said section from a predetermined position in the storage area.

References Cited
UNITED STATES PATENTS

| | | | |
|---|---|---|---|
| 3,186,266 | 6/1965 | Coate | 29—568 |
| 3,311,973 | 4/1967 | Anthony et al. | 29—568 |
| 3,344,511 | 10/1967 | Hosea | 29—568 |

ANDREW R. JUHASZ, *Primary Examiner.*

G. WEIDENFELD, *Assistant Examiner.*

U.S. Cl. X.R.

90—63, 64